May 25, 1948. L. LEE, 2D 2,442,049
CONTROL APPARATUS FOR INTERNAL-COMBUSTION ENGINES
Filed Sept. 19, 1946 3 Sheets-Sheet 2

INVENTOR.
LEIGHTON LEE II
BY
AGENT

INVENTOR.
LEIGHTON LEE II
BY Lester W Clark
AGENT

Patented May 25, 1948

2,442,049

UNITED STATES PATENT OFFICE 2,442,049

CONTROL APPARATUS FOR INTERNAL-COMBUSTION ENGINES

Leighton Lee, II, Rocky Hill, Conn., assignor, by mesne assignments, to Niles-Bement-Pond Company, West Hartford, Conn., a corporation of New Jersey Application September 19, 1946, Serial No. 697,873

11 Claims. (Cl. 123—119)

This invention relates to control apparatus for internal combustion engines, and particularly to apparatus for regulating the flow of fuel and/or air to the engine so as to maintain a selected fuel-air ratio. Although the invention is illustrated as applied to a conventional type of reciprocating engine, it should be readily apparent that its principles are equally applicable to other types, such as the turbine and jet types.

In most modern internal combustion engines, particularly those used on aircraft, the fuel-air ratio is controlled by measuring the air flow, measuring the fuel flow, and using a comparison of these two measurements to regulate the fuel flow so as to maintain a selected fuel-air ratio.

The conventional way of measuring the air flow is through the use of a Venturi meter to produce an air pressure differential which measures the volume of air flowing to the engine per unit time. Such meters are subject to at least two disadvantages. In the first place, if the Venturi meter is made large enough to handle the large volume of air required at maximum power output, then the air pressure differential which it provides at low air flows, as under engine idling conditions, is so small that it is not practically usable. In the second place, the density of the air varies considerably, especially in aircraft which must operate through a wide range of air temperature and pressure conditions. Therefore additional mechanism must be provided to compensate the air flow measuring device for variations in air density.

The measurement and control of the fuel flow in the conventional type systems also present several problems. The fuel flow is usually measured by taking the pressure drop across a fixed metering orifice as a measure of the fuel flow. This is satisfactory unless the fuel vaporizes at the orifice, or if there is vapor present in the fuel flowing to the orifice. The presence of vapor destroys the fixed relationship between the fuel pressure differential and the rate of fuel flow, so that the fuel pressure differential is then not an accurate measure of the fuel flow. Since the fuels commonly used on aircraft have a strong tendency to vaporize, this difficulty requires careful consideration in a design of a fuel system. The fuel flow is commonly controlled by means of one or more valves. These valves must operate over a relatively wide range of fuel flows and must control the fuel flow accurately at any point within that range. Because of these requirements, the valves are quite sensitive structures, and therefore are adversely affected by vibration.

An object of the present invention is to provide an improved apparatus for controlling the fuel-air ratio in an internal combustion engine.

Another object is to provide improved means for measuring the rate of flow of air through a compressor.

Another object of this invention is to provide an improved control system for an internal combustion engine where the temperature rise of the air flowing through a compressor, or supercharger, associated with the engine and the torque required to drive the compressor are together utilized to provide a measure of the rate of flow of air.

A further object is to provide improved control apparatus for an internal combustion engine having an air compressor wherein the compressor torque, the temperature rise across the compressor, and the rate of flow of fuel to the engine per engine revolution are combined to control a servomotor for regulating the fuel-air ratio.

Another object is to provide an improved system of the type described, wherein an injector pump is used to supply fuel to the engine, and the delivery setting of the injector pump is utilized as a measure of the rate of flow of fuel to the engine per engine revolution.

Other objects and advantages of the present invention will become apparent from a consideration of the appended specification, claims and drawings, in which:

Figure 1:
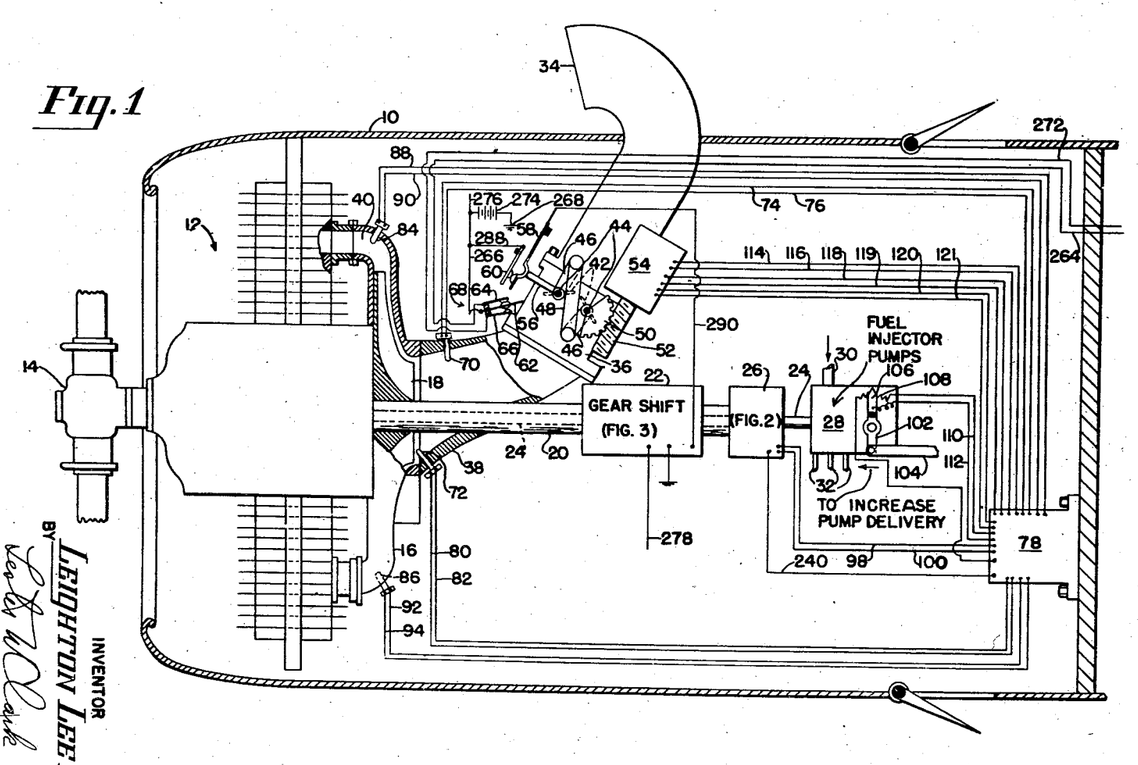
Figure 1 shows, somewhat diagrammatically, a control system for an internal combustion engine embodying the principles of my invention.

Referring to Figure 1, there is shown a sectional view through the cowling 10 around an aircraft engine generally indicated at 12. The engine 12 drives a propeller whose hub portion is shown at 14.

Mounted on the back of the engine is a supercharger 16 having an impeller 18 fixed on a shaft 20. The shaft 20 is hollow, and another shaft 24 rotates inside the hollow shaft 20. The two shafts 20 and 24 are connected by suitable gearing shown schematically at 26 and in greater detail in Figure 2 of the drawing. The shaft 24 extends beyond the end of shaft 20 and drives a fuel injection pump mechanism 28.

The injector pump mechanism 28 is provided with a fuel inlet 30 and with a plurality of fuel outlets 32 leading to the individual cylinders of the engine. The outlets 32 may alternatively deliver to the intake manifold just outside the engine cylinders, or they may deliver to a common discharge nozzle located in the supercharger inlet.

Combustion air flowing to the engine passes thru an air scoop 34 projecting above the cowling 10 and thence through a throttle body 36, and a supercharger inlet conduit 38 to the entrance of impeller 18. The air is discharged peripherally from the impeller 18 into the intake manifold 40, from whence it flows into the engine cylinders.

The flow of air is controlled by a pair of complementary throttle blades 42, which are fixed on shafts 44. Each shaft 44 is provided with an arm 46, and the ends of the arms 46 are connected by a link 48 so that the throttle blades 42 move concurrently. One of the shafts 44 is provided with a gear sector 50 which engages a worm 52 driven by a motor 54, so that the throttle blades are positioned by operation of motor 54.

One of the shafts 44 is provided with a switch-operating finger 56. In the position shown, the switch finger 56 has engaged a contact finger 58, moving it into engagement with a stationary contact finger 60. The contact fingers 58 and 60 form part of an electrical circuit for the operating mechanism of a gear shift 22, to be later described.

The switch-operating finger 56 also co-operates with a movable switch finger 62, which co-operates with two stationary switch fingers 64 and 66, and together with them forms a double-throw switch mechanism generally indicated by the number 68. The switch mechanism 68 forms part of a control circuit for a gate motor 172 shown in Figure 4.

A pair of electrical resistance elements 70 and 72 are mounted in the inlet conduit 38 so as to be exposed to the temperature of the air flowing through that conduit. These resistance bulbs may consist of an electrical resistance element mounted in a metal shell, in a manner well known in the art. The resistance element 70 is connected by a pair of conductors 74 and 76 to a power supply and amplifier unit generally indicated at 78. Resistance 72 is connected to the unit 78 by a pair of conductors 80 and 82.

Another pair of temperature responsive resistance elements 84 and 86 are mounted so as to be exposed to the temperature of the air on the discharge side of the supercharger 16. Resistance element 84 is connected to the unit 78 by a pair of conductors 88 and 90. Resistance 86 is similarly connected to the unit 78 by a pair of conductors 92 and 94.

Figure 2:
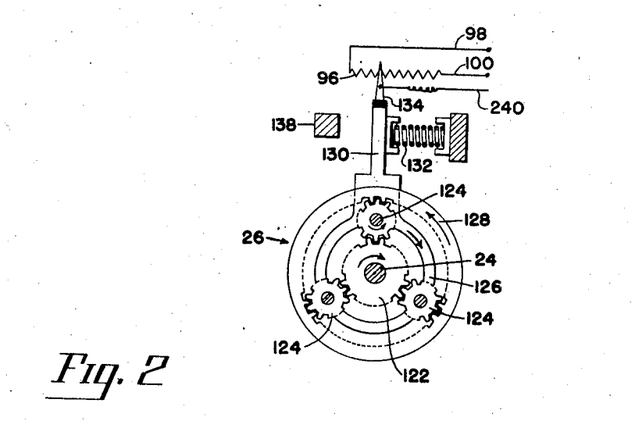
Figure 2 illustrates in detail a torque responsive variable resistance shown diagrammatically in Figure 1.

The gearing 26, which is shown in greater detail in Figure 2, includes a variable resistance 96, which is varied in accordance with the torque required to drive the supercharger impeller 18. The resistance 96 is connected to the unit 78 through conductors 98 and 100.

The injector pump mechanism 28 includes suitable apparatus for varying its delivery per revolution. This injector pump and its delivery control mechanism may be constructed in accordance with that shown in the co-pending application of George W. Baierlein, Serial No. 650,408, filed February 27, 1946.

Figure 3:
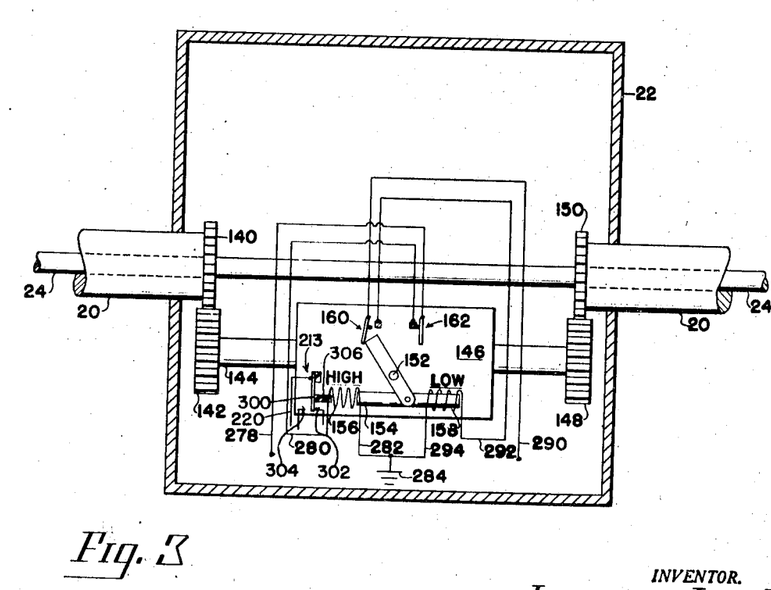
Figure 3 shows in greater detail an electrical gear-shifting mechanism shown diagrammatically in Figure 1.

The pump mechanism 28 is provided with a delivery control arm 102, connected by a link 104 with the pilot's control mechanism shown in detail in Figure 3. The opposite end of arm 102 is provided with a contact finger 106 which engages a resistance 108. The resistance of element 108 is thereby varied in accordance with the delivery per revolution of the pump mechanism, and hence the resistance of element 108 may be said to be a measure of that delivery. One terminal of resistance 108 and the contact finger 106 are connected by conductors 110 and 112, respectively, to the unit 78.

The motor 54 is connected to the unit 78 by six conductors 114, 116, 118, 119, 120 and 121.

The gearing mechanism 26, as shown in detail in Figure 2, includes a sun gear 122 fixed on the shaft 24, three planet gears 124 fixed on a spider 126, and a ring gear 128 connected by means not shown to the hollow shaft 20 which drives the supercharger impeller 18.

The spider 126 is provided with an upwardly extending arm 130, biased to the left by a spring 132.

The end of arm 130 carries an insulated sliding contact finger 134 which rides on the resistance element 96. Contact 134 is connected by a conductor 136 to the left terminal of resistance 96.

The shaft 24 and gear 122 rotate clockwise, as indicated by the arrow in the drawing. This drives the planet gears 124 counterclockwise about their respective pivots, and thereby drives the ring gear 128 counterclockwise. A clockwise torque is thereby applied to the spider 126, and this torque is proportional to the torque transmitted to the ring gear 128 to drive the supercharger impeller 18. The torque applied to spider 126 is resisted by spring 132, which is thereby deflected, allowing the slider 134 to move along the resistance 96. A stop 138 limits the leftward movement of arm 130 in a position corresponding to zero torque. The left end of resistance 96, as it appears in Figure 2, is connected to a conductor 98, and its right end is connected to a conductor 100. Slider 134 is connected to a conductor 240. As the slider 134 moves to the right along resistance 96, the resistance between conductors 98 and 240 is increased. When the arm 130 is in its zero torque position, the resistance between conductors 98 and 240 is zero. As the slider 134 moves to the right, the resistance between conductors 98 and 240 is gradually increased in proportion to the torque required to drive the supercharger or compressor.

Figure 3 illustrates in greater detail the gear shift mechanism shown schematically at 22 in Figure 1. Referring to Figure 3, it will be seen that the shaft 24 passes completely through the gear shift casing 22. The left portion of shaft 20 terminates in a gear 140, which mates with a gear 142 carried by a shaft 144. The shaft 144 extends through a gear shift mechanism 146 and carries at its opposite end another gear 148, which engages the gear 150 at the left end of the right-hand section of shaft 20.

The gear shift mechanism 146 may be of any conventional type. It includes a control arm 152 movable from the low-speed position indicated in the drawing to a high-speed position which is displaced clockwise from the position shown. The end of arm 152 is pivotally attached to an armature 154 which co-operates with a pair of electromagnets 156 and 158. When electromagnet 156 is energized, by an electrical circuit to be described later, the armature 154 is drawn to the left, thereby operating the arm 152 to its high-speed position. When electromagnet 158 is energized, the armature 154 is drawn to the right, thereby operating arm 152 to its low-speed position. The upper end of arm 152 co-operates with a pair of switches 160 and 162.

Figure 4:
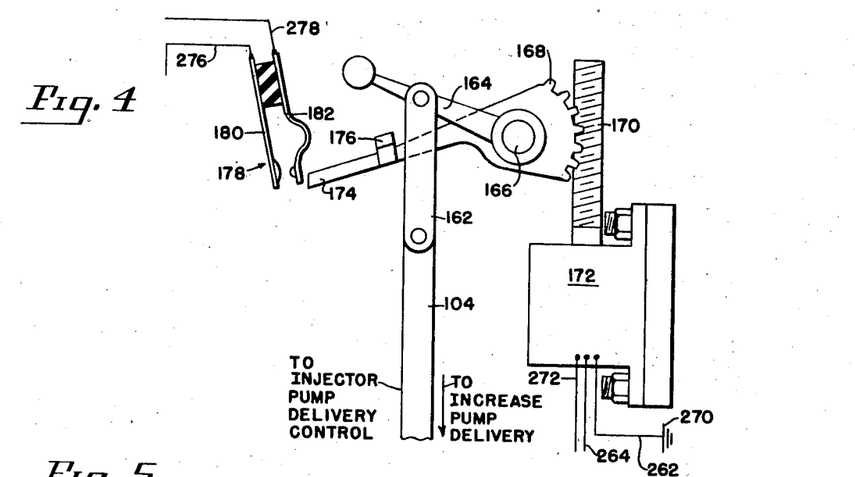
Figure 4 illustrates a manually operable control mechanism which is associated with the system of Figure 1.

Figure 4 illustrates the pilot's control mechanism by which the link 104 which actuates the pump delivery control of 102 is operated. There is shown in Figure 4 an extension of the link 104 of Figure 1. This may alternatively be another link located quite remote from link 104, but connected thereto through suitable mechanism so that the two move concurrently. The upper end of link 104 of Figure 4 is connected by a link 162 to a lever 164 pivotally mounted on a shaft 166. There is also mounted on the shaft 166, for free rotation thereon, a sector gear 168, which engages a worm 170 driven by a motor 172. The gear 168 is provided with a long leftward extension 174 which carries a stop 176 projecting forwardly into the path of lever 164. The tip of projection 174 serves as an operator for a switch mechanism 178. The switch mechanism 178 includes a stationary contact finger 180, and a movable contact finger 182.

Figure 5:
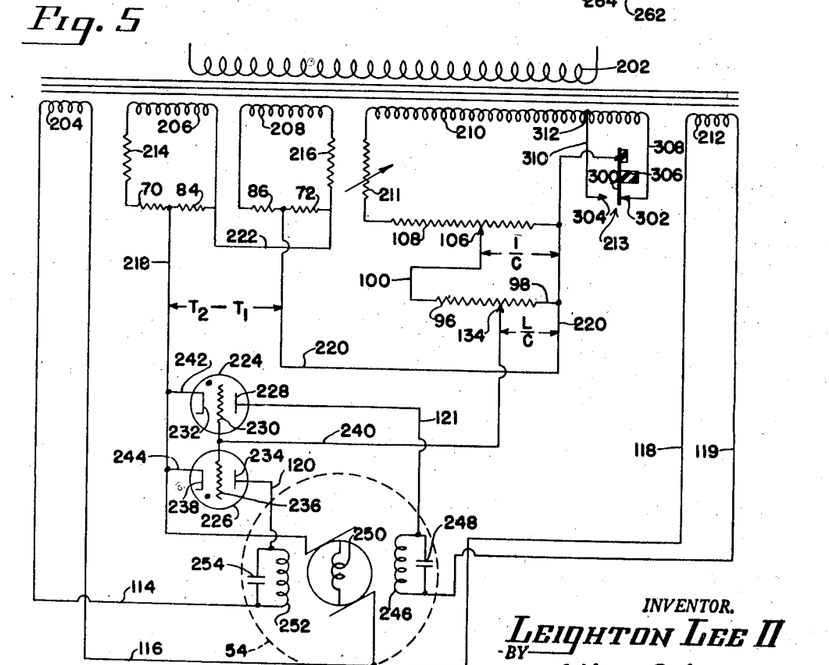
Figure 5 illustrates a wiring diagram of an electrical circuit used in the system of Figure 1.

There is shown in Figure 5 a wiring diagram illustrating in detail the connections between the various circuit elements which are shown in Figure 1 as being connected to the amplifier and power supply unit 78. Referring to Figure 5, it may be seen that the system is supplied with electrical energy through a transformer 200, having a primary winding 202 and secondary windings 204, 206, 208, 210 and 212. The winding 206 supplies electrical energy to a series circuit including resistance element 84, resistance element 70, and a fixed resistance 214. The potential drop across resistance 84 in this circuit may be expressed by the following equation:

$$IR_{84} = \frac{ER_{84}}{R_{84} + R_{70} + R_{214}} \quad (1)$$

where E represents the terminal voltage of the secondary winding 206, I represents current, and the various R characters represent the resistance of the element indicated by their associated subscripts.

The secondary winding 208 supplies electrical energy to a series circuit including a fixed resistance 216 and temperature responsive resistance elements 72 and 86. The potential drop across resistance 72 in this circuit may be expressed by the following equation:

$$IR_{72} = \frac{ER_{72}}{R_{72} + R_{86} + R_{214}} \quad (2)$$

The secondary windings 206 and 208 are designed to have the same terminal voltage, indicated by the letter E.

The potential drops across the resistances 74 and 72 are connected in series opposition in an external circuit by means of conductors 218, 220 and 222. Therefore the potential drop between the conductors 218 and 220 may be expressed by the following equation:

$$IR_{84} - IR_{72} = \frac{E(R_{84} - R_{72})}{R_{72} + R_{86} + R_{214}} \quad (3)$$

If the resistance of the elements 214 and 216 is made large as compared to the resistance of elements 70, 72, 74 and 86, then it may be considered that the denominator of the expression in the right-hand side of Equation 3 is a constant. Also it may be considered that the current flows through the two series circuits considered above are likewise constants. Then it follows that the potential drop between conductors 218 and 220 is determined by ($R_{84}-R_{72}$). But ($R_{84}$) is a measure of the supercharger discharge air temperature, and ($R_{72}$) is a measure of the supercharger inlet air temperature, so that the potential drop between conductors 218 and 220 is a measure of the temperature rise across the supercharger 18. Hence that potential drop may be expressed by ($T_2-T_1$), where ($T_2$) is the supercharger discharge temperature and ($T_1$) the supercharger inlet temperature.

The secondary winding 210 impresses a potential across the terminals of the resistance 108. For a given value of variable resistance 211 and a given position of switch 213, this potential is fixed. The slider 106 is moved along resistance 108 in a manner so that the potential between slider 106 and the right end of resistance 108 varies inversely with the setting of the pump delivery control arm C. This potential is impressed across the resistance 96. The slider 134 which co-operates with resistance 96 is arranged to change its position so that the resistance between slider 134 and the right end of resistance 96, as it appears in Figure 5, varies as the torque required to drive the supercharger L. Since the total potential across the whole resistance 96 is inversely proportional to the setting of the pump delivery controller, then the potential between slider 134 and the conductor 220 at the right end of resistance 96 is proportional to the torque required to drive the supercharger and inversely proportional to the setting of the pump delivery control. This potential is connected in series opposition with the potential between conductors 218 and 220.

The difference between these two potentials may be expressed as follows:

$$T_2 - T_1 - \frac{L}{C} \quad (4)$$

where L is the torque required to drive the supercharger, and C represents the fuel flow per engine revolution.

This potential difference is impressed across the inward terminals of an amplifier including a pair of gas-filled discharge tubes 224 and 226. The tube 224 has an anode 228, a control electrode 230, and a cathode 232. The discharge tube 226 has an anode 234, a control electrode 236, and a cathode 238.

The discharge devices 224 and 226 have a common input circuit which may be traced from the control electrodes 230 and 236 through conductor 240, slider 134, resistance 96, conductor 220, resistance 72, conductor 222, resistance 84, and conductors 218, 242 and 244 to the cathodes 232 and 238.

The output circuit of the discharge tube 224 may be traced from anode 228, through conductor 121, field winding 246 of motor 54, a condenser 248 in parallel with the winding 246, conductor 119, transformer secondary winding 212, conductor 118, armature winding 250 of motor 54, and conductors 218 and 242 to cathode 232.

The output circuit of discharge tube 226 may similarly be traced from anode 234 through conductor 120, field winding 252 and its parallel condenser 254, conductor 114, secondary winding 204, conductor 116, armature winding 250, and conductors 218 and 244 to cathode 238.

It should be noted that the secondary windings 204 and 212 are connected in phase opposition in their respective circuits. That is, the left terminal of winding 204, as it appears in the drawing, is connected to anode 234, while the right terminal of winding 212 is connected to anode 228. Since the windings 204 and 212 are secondaries on the same transformer, it should be apparent that the discharge tubes 224 and 226 may become conductive only on opposite half cycles. Since their common input circuit includes two potentials connected in phase opposition, one tube will become conductive when one potential predominates over the other and the other tube will become conductive when the second potential predominates. When the two are equal and balanced, neither tube will become conductive, or both will become conductive equally. If desired, suitable biasing voltage means may be inserted in the common input circuit to keep the both tubes inoperative when the input potentials are balanced. The field windings 246 and 252 of motor 54 are so related to the armature winding 250 that the motor runs in one direction when winding 246 is energized and in the opposite direction when winding 252 is energized.

If the motor 54 drives the throttles in an opening direction, this increases the air flow, thereby increasing the torque required to drive the supercharger and decreasing the temperature rise of the air compressed by the supercharger. On the other hand, if the throttles are driven in a closing direction, then the quantity of air is decreased, decreasing the torque required to drive the supercharger, but increasing the temperature rise of the air through the supercharger.

From the foregoing, it may be stated that the motor 54 is controlled applied to maintain the following equation in balance:

$$T_2 - T_1 = K \frac{L}{C} \quad (5)$$

which is readily recognized as a transformation of the expression set forth in (4) above.

Equation 5 may alternatively be written:

$$C = \frac{KL}{T_2 - T_1} \quad (5a)$$

It will now be proven mathematically, that if the system operates to maintain Equation 5 in balance, then it operates to maintain a constant fuel-air ratio.

The power required to drive a centrifugal compressor may be expressed as follows (The Engineer's Manual, by Ralph G. Hudson, second edition (1939), page 178, Equation 721):

$$P = 144 p_1 V_1 \frac{M}{M-1} \left[ \left( \frac{p_2}{p_1} \right)^{\frac{n-1}{n}} - 1 \right] \quad (6)$$

where

P is power expressed in foot-pounds per minute
$p_1$ is inlet pressure expressed in pounds per square inch
$V_1$ is inlet volume expressed in cubic feet per minute
$p_2$ is discharge pressure expressed in pounds per square inch
$n$ is the ratio of specific heats, which for air under the range of conditions encountered in aircraft, may be taken as 1.41

Converting all pressures to units of pounds per square foot (indicated by $P_2$, $P_1$) and power to horsepower units (indicated by HP), and substituting the numerical value for $n$, Equation 6 becomes:

$$HP = \frac{P_1 V_1 (3.44)}{33,000} \left[ \left( \frac{P_2}{P_1} \right)^{.29} - 1 \right] \quad (7)$$

From Boyle's law and Gay-Lussac's law, we have the well-known relation:

$$\frac{P_1 V_1}{T_1} = AR \quad (8)$$

where $P_1$, $V_1$ and $T_1$ are pressure, volume and temperature, respectively, of a gas under given conditions
A is weight of the gas under consideration, and
R is the gas constant=53.34 for air Substituting the value of $P_1 V_1$ from Equation 8 in Equation 7, we get $$HP = \frac{3.44 \times 53.34}{33,000} A T_1 \left[ \left( \frac{P_2}{P_1} \right)^{.29} - 1 \right] \quad (9)$$

Here A represents the air flow in pounds per minute. The change of state, produced by an air compressor of the type under consideration may be considered to be a polytropic one. For such a change, $$\frac{T_2}{T_1} = \left( \frac{P_2}{P_1} \right)^{\frac{n-1}{n}} \quad (10)$$

or $$T_2 = T_1 \left( \frac{P_2}{P_1} \right)^{\frac{n-1}{n}} \quad (11)$$

and $$T_2 - T_1 = T_1 \left[ \left( \frac{P_2}{P_1} \right)^{\frac{n-1}{n}} - 1 \right] \quad (12)$$

Substituting 12 in 9, we get $$HP = KA(T_2 - T_1) \quad (13)$$

where K is a constant.

From fundamental relationships, $$HP = L \times RPM_s \times K_1 \quad (14)$$

where L is torque.
$RPM_s$ is revolutions per minute of the supercharger and $K_1$ is a constant depending on the units used.

Equating 13 and 14, we get $$K_2 A (T_2 - T_1) = L \times RPM_s \quad (15)$$

or $$A = K_3 \frac{L \times RPM_s}{T_2 - T_1} \quad (16)$$

where $K_2$ and $K_3$ are constants.

Equation 16 gives a direct, easily measurable indication of mass air flow per unit time, which requires no altitude or density correction.

The fuel flow per unit time may be expressed as $$F = K_4 \times C \times RPM_p \quad (17)$$

where

F is the fuel flow in pounds per minute
C is the pump delivery per pump revolution
$RPM_p$ is the revolutions per minute of the pump, and
$K_4$ is a constant depending on the units used If a constant fuel-air ratio is maintained, then, dividing 17 by 16

$$\frac{F}{A} = \frac{K_4 \times C \times RPM_p}{K_3 \times \frac{L \times RPM_s}{T_2 - T_1}} = K_5 \quad (18)$$

but $RPM_p/RPM_s$ is a constant, since both pump and supercharger are engine driven, so Equation 18 reduces to $$K_6 \frac{C(T_2 - T_1)}{L} = K_5 \quad (19)$$

or $$T_2 - T_1 = K_7 \frac{L}{C} \quad (20)$$

which is substantially the same as Equation 5.

Therefore, it may be seen that since the control apparatus heretofore described operates to maintain Equation 20 in balance, it operates to maintain a constant fuel-air ratio.

The balanced electrical circuit described above could alternatively be used to operate a servo-motor to set the pump capacity control arm, in which case the throttles would be operated manually or by other suitable mechanism. In either case, the control system would maintain a constant fuel-air ratio.

When the throttle reaches its full open position, and the automatic system calls for a further increase in air flow to maintain the selected fuel-air ratio, such increase cannot be obtained by operation of the throttle. Under such conditions, it is necessary that the fuel flow be decreased to produce the required fuel-air ratio, rather than increasing the air flow. This is accomplished by the switch mechanism 68, which controls the motor 172 (Figure 4), which positions the manual lever stop 176.

The switch finger 62 is self-biased into engagement with stationary contact finger 64. At such times, a circuit is completed for energizing motor 172, which may be traced from the left terminal of battery 274 (Figure 4) through a conductor 266, switch finger 62, switch finger 64, conductor 264, motor 172, conductor 262, and ground connections 270 and 268 to the right terminal of battery 274. This circuit energizes motor 172 for operation in a direction to drive stop 176 away from lever 164, so that the stop does not limit the movement of the lever. This circuit is interrupted when the stop reaches the end of its travel by a limit switch built inside the motor 172 and not shown in the drawing.

When the throttle reaches its full open position, the finger 56 engages switch finger 62, moving it out of contact with stationary contact 64, and moving it into engagement with stationary contact 66. This completes another circuit for energizing motor 172, which may be traced from the left terminal of battery 274 through conductor 266, switch fingers 62 and 66, conductor 272, motor 172, conductor 262, and ground connections 270 and 268 to the right terminal of battery 274. This circuit energizes motor 172 for operation in a direction to drive stop 176 toward the lever 164 so as to limit the movement of the latter in a fuel increasing direction. In fact, the energization of this circuit continues until stop 176 engages lever 164 and pushes it upward in a fuel flow decreasing direction. This movement continues until the automatic control circuit responds to the continued operation of slider 106 across resistance 108 by moving the throttles slightly toward closed position, whereupon the contact finger 62 is separated from contact finger 66 to interrupt the motor circuit just traced.

After the stop 176 has moved a predetermined distance in a fuel flow decreasing direction, then the tip of projection 174 moves upward into engagement with switch finger 182, moving the latter to the left and into engagement with contact 180. This completes an energizing circuit for the high speed electromagnet 156 of the gear-shifting mechanism 162. This circuit may be traced from the left terminal of battery 274 (Figure 1) through a conductor 276, switch finger 180 (Figure 4), switch finger 182, conductor 278, switch 162 (Figure 3), conductor 280, electromagnet 156, conductor 282, and ground connections 284 and 268 to the right terminal of battery 274. Energization of electromagnet 156 causes operation of the gear-shifting mechanism to its high speed position, thereby driving the supercharger at a faster rate, and increasing the air flow available at any given throttle position. As the gear-shifting mechanism moves to its high speed position, the circuit just traced is broken at switch 162. The resulting and sudden increase in the air flow restores control to the balanced control circuit, which closes the throttles partially, thereby restoring switch mechanism 68 to its original position and thereby causing operation of motor 172 to retract the stop 176 away from lever 164.

If, with the supercharger gear-ratio control in its high speed position, the aircraft should return to a lower altitude where sufficient air could be obtained without the high speed drive, the balanced control system will gradually close the throttles until the finger 56 engages switch 58 and moves it into engagement with switch finger 60. This completes an energizing circuit for the low speed electromagnet 158 of the gear-ratio control mechanism 126. This circuit may be traced from the left terminal of battery 274, through conductor 288, switch fingers 60 and 58, conductor 290, switch 160, conductor 292, electromagnet 158, conductor 294, and ground connections 284 and 268 to the right terminal of battery 274. The supercharger is thereby shifted to low speed operation, and the resulting sudden decrease in air flow causes operation of the throttle servo-motor to restore the selected constant fuel-air ratio.

When the gear ratio control is shifted from its low speed to its high speed position, or vice versa, the ratio $RPM_p/RPM_s$, which was considered to be a constant in making the transformation from Equation 18 to Equation 19, above, is changed. The ratio is decreased on moving the supercharger from low speed to high speed position, and increased on the opposite move. If it requires a given torque to move a given quantity of air through the supercharger at low speed, then it requires a greater torque to move the same amount of air through the supercharger at high speed. In order that the position of slider 134 on resistance 96 may serve as a true measure of torque in either position of the supercharger gear shift, I have provided mechanism for reducing the electrical potential applied to the terminals of resistance 96 whenever the gear shift is moved to its high speed position. This mechanism includes a double-throw switch 213. This switch 213 is operated concurrently with the gear shift, as indicated in Figure 3. The switch 213 includes a finger 300, self-biased into engagement with a contact 302. A block 306 is mounted on the finger 300, and lies in the path of movement of armature 154. When the gear shift is moved to its high speed position, the armature 154 engages block 306 and moves finger 300 out of engagement with contact 302 and into engagement with a contact 304. Finger 300 is connected through conductors 220 and 98 to the right end of resistance 96. Contact 302 is connected through a conductor 308 to the right end of transformer secondary winding 210. Contact 304 is connected through a conductor 310 to a tap 312 located on secondary winding 210 at a point spaced from its right end. Therefore the effect of moving finger 300 from contact 302 to contact 304 is to reduce the potential across resistance 96. Thus when the gear shift is moved from low to high, the potential across resistance 96 is reduced. While the increased torque due to the increased speed of the supercharger may cause a deflection of slider 134 along resistance 96, the reduced potential across resistance 96 compensates for the increased deflection of slider 134 so that the potential between slider 134 and conductor 220 continues to be a true measure of torque.

A variable resistance 211 is connected between the left end of resistance 108 and the left end of secondary winding 210. This resistance is manually variable, and is mounted so that it may be manipulated by the pilot or other member of the aircraft crew. By varying resistance 211, the potential applied across resistance 108 may be varied to change the fuel-air ratio. In this way, the pilot may select any desired fuel-air ratio within the range of operation of resistance 211.

In the control system described herein, acceleration of the engine tends to produce a richer fuel-air ratio than normal. This is to be contrasted to the tendency of a conventional fuel supply system to run lean during acceleration. Conventional systems are commonly supplied with acceleration pumps and other devices to make them run richer during acceleration. Such additional equipment is unnecessary in the present system. When it is desired to accelerate the engine, the injector pump control is manually moved, which in itself has a tendency to produce a rich mixture because of the unavoidable lag before the system responds to open the throttles and increase the air supply. Furthermore, the resulting increase in engine speed will accelerate the supercharger, and an additional torque will be used in accelerating the supercharger. This additional torque will be measured by the fuel control system and will indicate to the system an air flow somewhat greater than the actual air flow. As long as this transient accelerating torque appears in the system, it will cause the fuel-air ratio to be richer than normal, since the air flow measurement by the system will be slightly too great as compared with actual air flow, and the system will tend to balance out with an air flow less than that required to maintain the preselected fuel-air ratio. As soon as the transient accelerating torque disappears, the fuel-air ratio is restored to its normal value.

In the system described, the sensitivity of measurement of air flow and fuel flow is the same under low flow conditions as at maximum flow conditions. The conventional fuel supply systems require special controls for idling conditions, which are not needed in the present system.

Another advantage of the present system is that no venturi is require in the air stream. In conventional systems, the maximum possible engine power output is limited by the area of the air venturi throat, since that is the smallest area in the air supply conduit. No such limitation exists when the present system is used. The air supply system can therefore be designed with greater freedom and better air distribution to the cylinders of a multiple cylinder engine can be secured.

In the system disclosed, the fuel conduit structure is also simplified as compared with conventional systems, because of the absence of fuel flow measuring jets or orifices in the fuel conduit.

The terms and expressions which I have employed are for use as terms of description and not of limitation, and I have no intention in the use of such terms and expressions, of excluding any equivalent of the features shown and described or portions thereof, but recognize that various modifications are possible within the scope of the invented claims.

I claim as my invention:

1. Control apparatus for an internal combustion engine having an air compressor for supplying combustion air thereto, comprising means for measuring the torque required to drive said compressor, means for measuring the increase in temperature of the air in passing through said compressor, and means including both said measuring means for controlling the flow of air to said engine.

2. Apparatus for measuring the flow of a variable density fluid through a rotary compressor, comprising means for measuring the torque required to drive said compressor, means for measuring the increase in temperature of the fluid passing through said compressor, and means associated with both said measuring means for utilizing the ratio of torque to temperature rise as a measure of fluid flow.

3. Control apparatus for an internal combustion engine having an air compressor for supplying combustion air thereto, comprising manually operable means for controlling the rate of flow of fuel to said engine, means for measuring the torque required to drive said compressor, means for measuring the increase in temperature of the air passing through said compressor, and means responsive to said manually operable means and to both said measuring means for controlling the flow of air to said engine.

4. Control apparatus for an internal combustion engine having an air compressor for supplying combustion air thereto, comprising injector pump mechanism driven by said engine for delivering fuel thereto, manually operable means for varying the quantity of fuel delivered by said pump means for revolution of said engine, means for measuring the torque required to drive said compressor, means for measuring the increase in temperature of the air passing through said compressor, and means responsive to said manually operable means and to both said measuring means for controlling the flow of air to said engine.

5. Control apparatus for an internal combustion engine having an air compressor for supplying combustion air thereto, comprising: manually operable means for controlling the quantity of fuel supplied to said engine per revolution (C), means for measuring the torque (L) required to drive said compressor, means for measuring the increase in temperature ($T_2-T_1$) of the air passing through said compressor, and means responsive to said manually operable means and to both said measuring means for controlling the flow of air to said engine so as to maintain the following relationship:

$$C = \frac{KL}{T_2 - T_1}$$

where K is a constant.

6. Control apparatus for an internal combustion engine having an air compressor for supplying combustion air thereto, comprising injector pump mechanism driven by said engine for delivering fuel thereto, manually operable means for varying the quantity of fuel delivered by said pump means per revolution of said engine, means for measuring the torque (L) required to drive said compressor, means for measuring the increase in temperature ($T_2-T_1$) of the air passing through said compressor, and means responsive to said manually operable means and to both said measuring means for controlling the flow of air to said engine so as to maintain the following relationship:

$$C = \frac{KL}{T_2 - T_1}$$

where K is a constant.

7. An electrical network for measuring the difference between first and second temperatures, comprising a first pair of substantially similar electrical resistance elements having an appreciable temperature coefficient of resistance and exposed to said first temperature, a second pair of substantially similar electrical resistance elements having an appreciable temperature coefficient of resistance and exposed to said second temperature, a pair of fixed electrical resistance elements having resistance values substantially greater than those of said first and second pairs, a pair of sources of electrical energy, a pair of electrical circuits, each of said circuits including, in series, one of said sources and one of each of said pairs of resistance elements, and a third electrical circuit including the one of said first pair of resistances connected in one of said pair of circuits and the one of said second pair of resistances connected in the other of said pair of circuits, the resistances in said third circuit being connected in series so that the potential drops across them are in opposition and the potential across the two resistances in series in said third circuit is a measure of the difference between said first and second temperatures.

8. Electrical apparatus for measuring the ratio of two variables, comprising a source of electrical energy, a first impedance element connected across said source, a slidable contact movable along said element, means responsive to one of said two variables for moving said contact along said impedance element so that the impedance between said contact and one end of said element varies inversely as one of said variables, a second impedance element connected between said one end of said first element and said contact, a second contact slidable along said second element, and means responsive to the other of said two variables for moving said second contact along said second element so that the impedance between said second contact and said one end of said first element varies directly as the other of said variables, and the potential between said second contact and said one end of said first element varies as the ratio of said two variables.

9. Control apparatus for an internal combustion engine having an air compressor for supplying combustion air thereto, comprising manually operable means for controlling the quantity of fuel supplied to said engine per revolution, a first source of electrical energy, a first electrical impedance element connected across said source, a slidable contact movable along said element, means associated with said manually operable means for moving said contact concurrently therewith so that the impedance between said contact and one end of said elements varies inversely as the quantity of fuel supplied per engine revolution, means for measuring the torque required to drive said compressor, a second electrical impedance element connected between said one end of said first element and said contact, a second contact slidable along said second element, means associated with said torque measuring means for moving said second contact along said second element so that the impedance between said second contact and said one end of said first element varies directly as said torque and the electrical potential between said second contact and said one end of said first element varies as the ratio of said torque to the quantity of fuel supplied to the engine per revolution, a first pair of substantially similar electrical resistance elements having an appreciable temperature coefficient of resistance and exposed to the temperature of the air at the inlet of said compressor, a second pair of substantially similar electrical resistance elements having an appreciable temperature coefficient of resistance and exposed to the temperature of the air at the outlet of said compressor, a pair of fixed electrical resistance elements having resistance values substantially greater than those of said first and second pairs, a pair of sources of electrical energy, a pair of electrical circuits, each of said circuits including, in series, one of said pair of sources and one of each of said pairs of resistance elements, first conductor means connecting in series the one of said first pair of resistances connected in one of said pair of circuits and the one of said second pair of resistances connected in the other of said pair of circuits, said resistances being connected by said conductor means so that the potential drops across them are in opposition and the potential across the two resistances in series is a measure of the difference between said inlet and outlet temperatures, additional conductor means connecting in series the group of two resistances connected by said first conductor means and the impedance between said second contact and said one end of said first element so that the potential across said group of two resistances opposes the potential between said contact and said one end of said first element, and means responsive to the difference of said last-mentioned opposed potentials for controlling the rate of flow of combustion air to said engine.

10. Control apparatus for an internal combustion engine having an air compressor for supplying combustion air thereto, comprising manually operable means for controlling the quantity of fuel supplied to said engine per revolution, means for measuring the torque required to drive said compressor, means including a first electrical network associated with said manually operable means and said torque measuring means for producing a first electrical potential varying as the ratio of said torque to said quantity of fuel supplied per revolution, means for measuring the temperature increase of the air passing through said compressor, means including a second electrical network associated with said temperature measuring means for producing a second electrical potential varying as said temperature increases, and electrical means for balancing said potentials against each other and for controlling the flow of combustion air through said compressor in accordance with the balance or unbalance of said potentials.

11. Control apparatus for an engine having an air compressor for supplying combustion air thereto, comprising means for measuring the rise in temperature of the air in passing through said compressor ($T_2-T_1$) means for measuring the torque (L) required to drive said compressor, means for measuring the fuel flow to said engine per revolution thereof (C), means for controlling the flow of air to said engine, means for controlling the flow of fuel to said engine, a manual operator for one of said controlling means, motor means for positioning the other of said controlling means, and means including all said measuring means for controlling said motor means to maintain the relationship:

$$C = \frac{KL}{T_2 - T_1}$$

where K is a constant.

LEIGHTON LEE, II.